US 6,672,543 B2

(12) United States Patent
Carlson et al.

(10) Patent No.: US 6,672,543 B2
(45) Date of Patent: Jan. 6, 2004

(54) COMPACT MECHANISM FOR RETRIEVAL OF A TOWED BODY FROM MOVING VEHICLES

(75) Inventors: Mark A. Carlson, Amherst, NH (US); James J. Jordan, Nashua, NH (US); John Russotti, Hudson, NH (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 0 days.

(21) Appl. No.: 10/027,352

(22) Filed: Dec. 20, 2001

(65) Prior Publication Data

US 2003/0071164 A1 Apr. 17, 2003

Related U.S. Application Data

(60) Provisional application No. 60/328,594, filed on Oct. 11, 2001, provisional application No. 60/328,603, filed on Oct. 11, 2001, and provisional application No. 60/328,617, filed on Oct. 11, 2001.

(51) Int. Cl.$^7$ ................................................. B64D 3/02
(52) U.S. Cl. ........................ 244/170; 244/115; 273/360
(58) Field of Search ........................... 244/137.1, 137.4, 244/170, 3, 115, 116; 242/388.1, 579, 476.1, 476.2; 114/253, 254; 273/360, 361

(56) References Cited

U.S. PATENT DOCUMENTS

| 3,874,013 | A | * | 4/1975 | Hudson ............................. 9/9 |
| 3,987,746 | A | | 10/1976 | McCulloh |
| 4,718,320 | A | * | 1/1988 | Brum ........................... 89/1.11 |
| 4,808,999 | A | | 2/1989 | Toman |
| 4,978,086 | A | | 12/1990 | Spicer |
| 5,014,997 | A | | 5/1991 | Smith et al. |
| 5,020,742 | A | | 6/1991 | Haslim |
| 5,029,773 | A | | 7/1991 | Lecat |
| 5,094,405 | A | | 3/1992 | Brum |
| 5,102,063 | A | | 4/1992 | Brum |
| 5,136,295 | A | | 8/1992 | Bull et al. |
| 5,333,814 | A | | 8/1994 | Wallis |
| 5,501,411 | A | | 3/1996 | Brum et al. |
| 5,570,854 | A | | 11/1996 | Brum et al. |
| 5,603,470 | A | | 2/1997 | Fitzgerald et al. |
| 5,605,306 | A | | 2/1997 | Fitzgerald et al. |
| 5,836,535 | A | | 11/1998 | Brum |
| 6,199,793 | B1 | * | 3/2001 | Hainsworth et al. ...... 244/1 TD |

* cited by examiner

Primary Examiner—Galen L. Barefoot
(74) Attorney, Agent, or Firm—Robert K. Tendler; Daniel J. Long (57) ABSTRACT

Recovery of a towed body, in one embodiment in the form of a decoy which is initially stowed in a receptacle or canister and which is allowed to pay out behind an aircraft on a towing cable wrapped around a spindle, is accomplished by snaring or lassoing a portion of the towing cable and by dragging it to a further spindle which is driven so as to cause the lasso and a portion of the towing cable to wind up around the driven spindle. When a sufficient amount of the cable is wound around the driven spindle, the cable end secured to the canister is severed to allow all of the rest of the towing cable to be wound up. In one embodiment, a telescoping saddle or docking cradle is provided which extends from the canister to receive the retracted towed body so that it may be secured to the moving vehicle from whence it can be recovered, refurbished, and redeployed.

12 Claims, 7 Drawing Sheets

COMPACT MECHANISM FOR RETRIEVAL OF A TOWED BODY FROM MOVING VEHICLES

CROSS REFERENCE TO RELATED APPLICATIONS

This application claims rights under 35 U.S.C. 119(e) under U.S. Provisional Applications Ser. No. 60/328,594; 60/328,603; and 60/328,617, all filed on Oct. 11, 2001.

FIELD OF INVENTION

This invention relates to towed bodies and more particularly to a recovery mechanism for recovering the towed body for reuse.

BACKGROUND OF THE INVENTION

As will be appreciated, aerial towed objects are used for a variety of purposes, including decoys, testing, and scientific investigations. In one embodiment the decoys are used to draw various types of guided weapons away from an aircraft that the weapons are intended to destroy. As will be appreciated, these towed targets and decoys contain various types of electronic circuits to create an apparent target to a weapon to attract the weapon to the decoy rather than the aircraft. One such active electronic device is a amplifier wave tube transponder to which high voltages must be applied to power the traveling wave tube. Additionally, other controls for the traveling wave tube or other electronics in the towed object are transmitted in one embodiment along a fiber-optic transmission line, which is both fragile and frangible.

The typical manner of deployment is such that when the decoy has fulfilled its function, it is simply cut loose. In this case, the fiber optic wires and the high tension line are severed, with the severing taking place after the high voltage has been removed and after all usable signals along the fiber optic cable have been terminated.

The practice of cutting loose decoys after use and using them as an expendable commodity causes a number of problems. As a result it becomes important to be able to recover the towed vehicle itself, mainly because of the cost of the towed vehicle, as well as the fact that replacing towed vehicles often is difficult due to the long lead times for the manufacture and provision of such decoys.

For instance, typically a towed counter-measure decoy may cost as much as $50,000 per decoy round. As many as eight decoys per sortie or mission can be deployed and as such, assuming 400 sorties per month, then the total expense of deploying expendable decoys is quite large, making the cost for the protection of the aircraft that employs these decoys excessive. Moreover, in a wartime setting the decoy cannot be manufactured quickly enough. So bad is the situation that it may be necessary to scrounge used decoys from the battlefield where they fall.

It will be appreciated that prior to the subject invention, the only type of retrievable devices from aircraft were the sonobuoys that were dropped from helicopters on a line and then winched back up into the helicopter itself. Another type of towed device is an air speed head that is used to measure a variety of parameters behind an airplane. These types of devices were winched back into a pod on the aircraft in a conventional manner.

It will be appreciated that in the above examples of winched-in sonobuoys or towed instruments, the instruments were never meant to be disposable and were never used, for instance, in any kind of airborne counter-measure environment. Thus they were not carried in such a manner that they could be rapidly deployed in a battlefield scenario.

Previous embodiments of the above airborne-winch systems are incompatible with deployment of towed decoys and current volume constraints on tactical aircraft, both due to size and due to problems with slowly winching out a drogue or towed vehicle of any kind. Note that sonobuoys and pod-mounted countermeasures typically were carried in an equipment pod the size of the MK-84 aerial bomb or the ALQ164-type electronics counter-measures pod. What will be appreciated is that these pods are exceptionally large and preclude, for instance, the carrying of armaments in the position where a pod is located. Thus the payload of any attack aircraft is severely limited when using such unwieldy winching systems along with associated housings which are many times the size of the normal decoy round.

There is therefore a need for a compact launching and retrieval system for decoy rounds with an improved and miniaturized winching mechanism that would permit both rapid deployment of the decoy while at the same time being able to reel in the decoy and permitting it to dock so that it can be recovered.

By way of further background, the types of decoys involved have included devices which counter-measure infrared guided and radar guided missiles that pose the primary threats to military aircraft engaged in a combat environment. It will be appreciated that these missiles use their radar guidance systems to get within striking distance of the aircraft, thereby substantially increasing their probability that the IR system on the missile will be able to lock onto the target.

Current military aircraft are particularly vulnerable to attack from IR-guided surface-to-air and air-to-air missiles. Statistical data of aircraft losses in hostile actions since 1980 show that almost 90 percent of these losses have been the result of IR-guided missile attacks. As a result, the ability to deploy and then recover decoys that can counter-measure the IR guidance systems on these missiles is of great value to protect aircraft during combat situations. As mentioned above, the IR-guided system initially utilizes radar guidance and then switches over to IR guidance as they come into closer proximity to the target. If one can counter-measure the radar system, then the IR portion can never lock onto the particular infrared target. To do this, the missile is deflected away by generating a signal that causes the radar guidance system in the missile to think that the target is actually elsewhere than it actually is.

In the past, the ALE-50 Towed Decoy system currently in the inventory of the US Armed Forces includes a decoy round in a canister and a reel payout mechanism. When the decoy has served its purpose, it is cut loose and the ALE-50 decoy is lost.

Moreover, the same scenario is true for the more modern ALE-55, or in fact, any type of expendable towed vehicle.

In summary, prior art decoys were intended to be sacrificed and the towline was typically cut at the aircraft at the end of flight or mission. Thus, these systems did not contemplate the winching in or reeling in of the decoy. The reason is because these decoys needed to be rapidly deployed. One rapid deployment method included a spindle that paid out the towline in much the same way as a spinning reel pays out fishing line. Although spinning reel-like techniques have existed for fishing, in the area of rapidly deployed decoys they were not used to winch decoys. Also, the spindles themselves were not necessarily driven.

As will be appreciated, there are a number of U.S. patents that in general cover towed vehicle deployment, such as U.S. Pat. Nos. 5,836,535; 5,603,470; 5,605,306; 5,570,854; 5,501,411; 5,333,814; 5,094,405; 5,102,063; 5,136,295; 4,808,999; 4,978,086; 5,029,773; 5,020,742; 3,987,746 and 5,014,997, all incorporated by reference herein. In none of these patents is the subject retrievable system shown or taught.

SUMMARY OF THE INVENTION

In the subject system, a device is deployed that captures the towline and reels it in to the canister so that as the towline is brought in, the deployed decoy is reeled in, and is secured to a cradle or saddle which telescopes out from the canister during the retrieval process. The decoy is captured by the cradle due to the tug of the tow line around sheaves or other like devices such that the decoy is taken up and is held to the cradle from whence it can be removed when the aircraft returns to base.

The result is that the decoy is not lost or sacrificed but is rather brought back for reuse or refurbishment, thus saving both time and money when it comes to redeployment.

As part of the subject invention, the towline is not itself initially winched but rather is lassoed, with the lasso being winched in. In one embodiment, the lasso is within an annular ridge on a frame through which the towlines pass as they pay out.

Since the towline is taut between its point of anchor to the canister and the decoy, the lasso collapses down around the towline and causes a loop to be formed in the towline. This loop is then dragged to a motor-driven spindle, which when activated causes both the lasso and the looped portion of the towline to wrap around the spindle. When a sufficient number of turns of the looped towline are wrapped around the spindle, the portion of the towline anchored to the canister is cut and the friction of the already wrapped towline is sufficient to draw in the decoy until such time that it is snugged up to the now-deployed cradle. This means that the decoy can be rapidly deployed from a fixed spindle on which the towing line is carried without having to have the spindle also function as a winch which would limit the speed of deployment.

The result is that a compact deployment and retrieval canister 1/10th the size of the aforementioned pods can be utilized so that the decoys need not be sacrificed. Moreover, because of the compact size of the deployment canister, the canisters can be affixed to the aircraft at points which do not interfere with the placement of weapons loads. The result is that decoys can be stored, launched and retrieved without diminishing the weapons payload of the aircraft.

In summary, recovery of a towed body, in one embodiment in the form of a decoy which is initially stowed in a receptacle or canister and which is allowed to pay out behind an aircraft on a towing cable wrapped around a spindle, is accomplished by snaring or lassoing a portion of the towing cable and by dragging it to a further spindle which is driven so as to cause the lasso and a portion of the towing cable to wind up around the driven spindle. When a sufficient amount of the cable is wound around the driven spindle, the cable end secured to the canister is severed to allow all of the rest of the towing cable to be wound up. In one embodiment, a telescoping saddle or docking cradle is provided which extends from the canister to receive the retracted towed body so that it may be secured to the moving vehicle from whence it can be recovered, refurbished and redeployed.

BRIEF DESCRIPTION OF THE DRAWINGS

These and other features of the subject invention will be better understood in connection with the Detailed Description and in conjunction with the Drawings, of which.

DETAILED DESCRIPTION

Figure 1A:
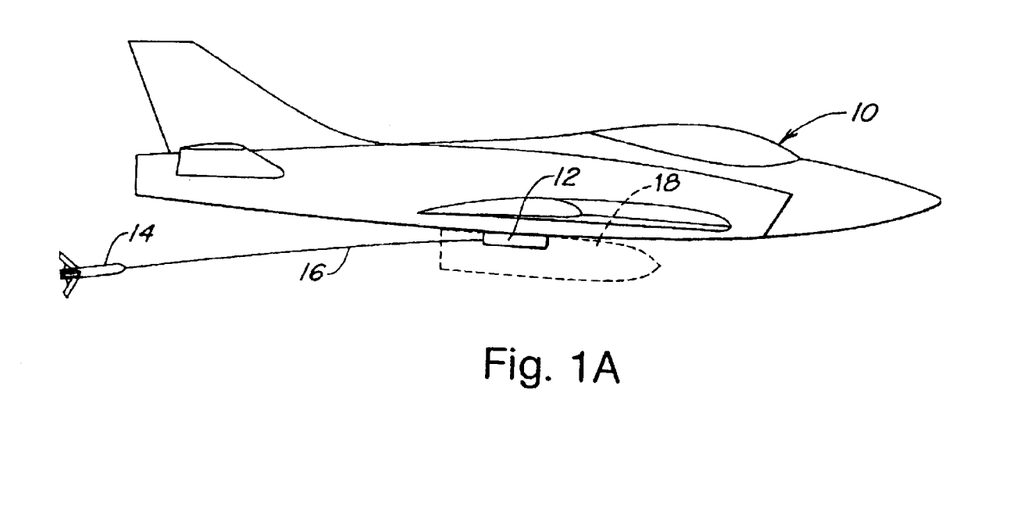
FIG. 1A is a diagrammatic representation of a fighter aircraft showing the deployment of a decoy from a canister which is clearly 1/10th the size of pods previously utilized for winching or electronic countermeasure equipment housing.

Referring now to FIG. 1A, an aircraft 10, here a fighter aircraft such as an F-18, is provided with a canister 12 from which a decoy or drogue 14 is deployed after the aircraft, with the decoy being towed via a towline 16 as illustrated.

The actual dimensions of the canister, in one embodiment, are 2-3/4" by 2-3/4" by 22" in length. As shown in dotted outline 18, typical countermeasure pods, which are usually affixed to the underside of the aircraft, are on the order of 12–18 inches in diameter and are as long as eight feet in length. It will be appreciated that such a large pod precludes the co-location of armament of any kind in that area and in addition contributes significantly to wind drag. It will be appreciated that the wind drag caused by such electronics countermeasure pods can significantly decrease the range of such fighters and is therefore to be avoided.

Figure 1B:
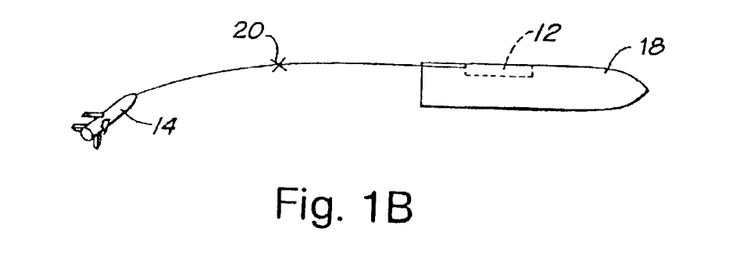
FIG. 1B is a diagrammatic illustration of the severing of the towline from such a pod, thereby resulting in the loss of the decoy.

As shown in FIG. 1B, in the prior art, when the decoy 14 has served its purpose, towline 16 is severed as illustrated at 20, such that the decoy or drogue is lost.

What is therefore necessary is a deployment and retrieval system which is both compact and which permits the recapture of the decoy so that it may be reused.

Figure 2:
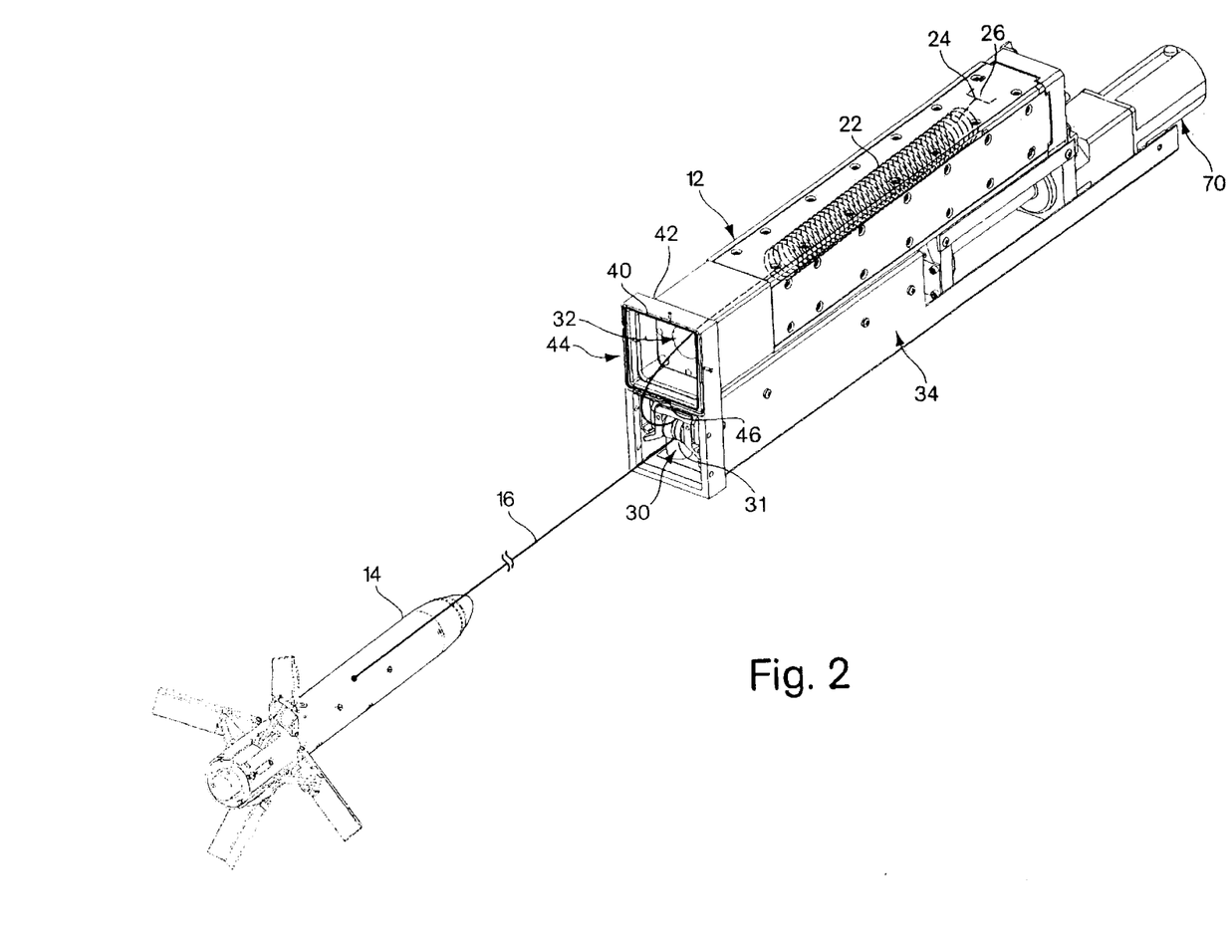
FIG. 2 is a perspective and diagrammatic illustration of a canister showing the deployment of a decoy from an upper portion thereof, with a lasso surrounding the tow cable and running through an extensible or telescoping saddle or cradle decoy recovery unit.

Referring now to FIG. 2, canister 12 is illustrated in which towline 16 attached to decoy 14 is shown as having uncoiled from a spindle, not shown, such that the stored towline is initially coiled as illustrated at 22, with its proximal end 24 secured to the canister. When the decoy is deployed, there is significant tension on the part of tow cable 16, with the only point of attachment to the canister and thus the aircraft being at anchor 26 within the canister.

As will be seen, a telescoping recovery cradle or saddle 30 lies underneath an upper compartment 32 in which the decoy is originally stored. The cradle carries a pulley 31 about which cable 16 goes during deployment. It will be appreciated that compartment 32 is in essence a sub-assembly of the canister, which can be mounted on the retrieval portion 34 of canister 12 and can be any of a variety of deployment canisters, such that the subject retrieval system is not limited to any one type of deployment canister, but rather can accommodate pre-packed decoy rounds from a number of different sources. Note that there can be single or multiple cables between the canister and the decoy.

The problem then becomes that rather than cutting the towlines, how is it possible to recover a decoy that may have as many as three or four lines attaching it to the canister.

In order to accomplish the snaring of one or more lines that function as towlines or signal lines and referring now to FIG. 2, a loop or lasso 40 is positioned at a free edge of a frame 42 which is at the distal end 44 of the canister subassembly, such that the lines pass through the orifice defined by the loop. As will be seen in FIG. 3, there is a joined portion 46 of the loop, with a line 47 from this joint running back through the telescoping cradle as will be discussed.

Figure 3:
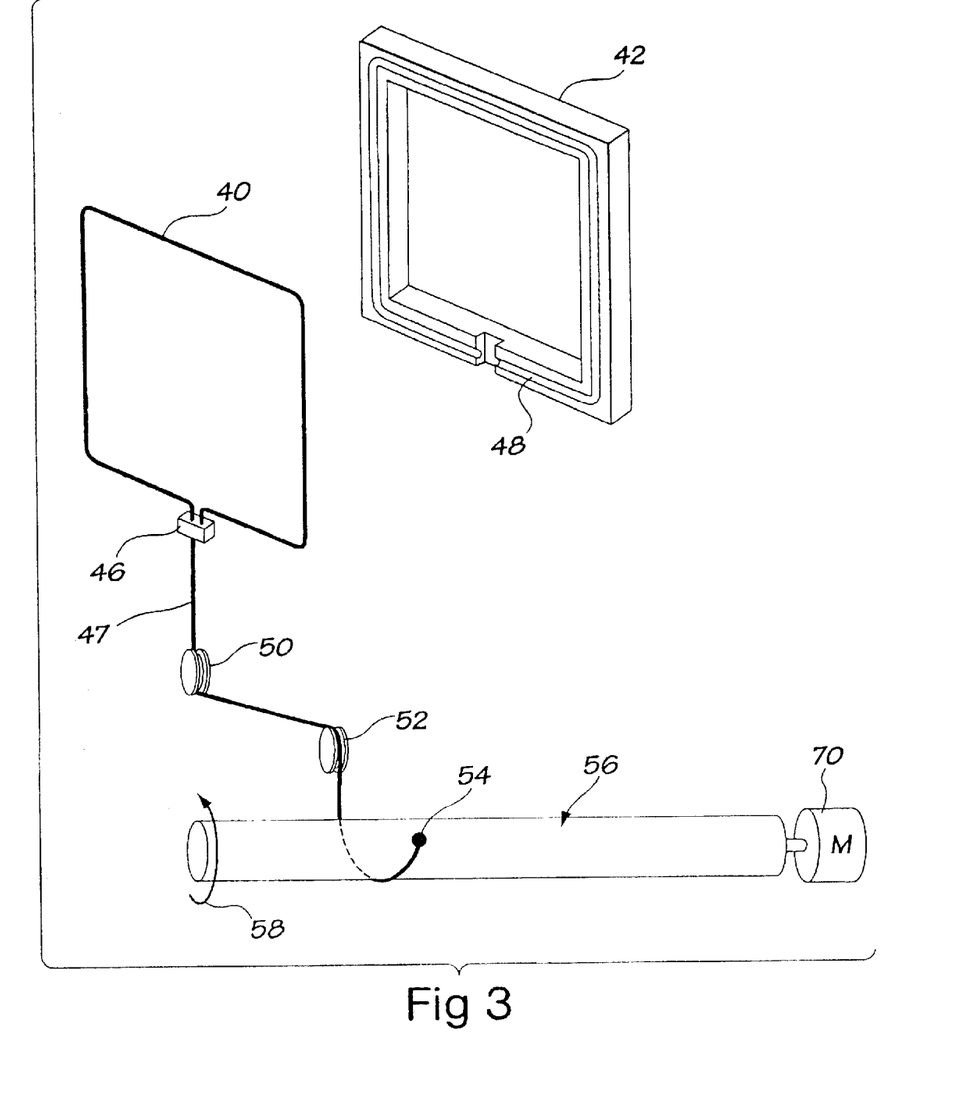
FIG. 3 is a diagrammatic illustration of the lasso of FIG. 2 in exploded form, illustrating the placement of a loop into a retaining slot in frame of FIG. 1, also showing the attachment of the lower end of the loop to a driven spindle.

Referring to FIG. 3, loop 40 is illustrated as being mountable in a loop-retaining slot 46 in frame 42, which may be held in the slot by wax or silicone adhesive.

Line 47 from the joined portion 46 of loop 40 is shown schematically to go around a pulley 50 and then around a pulley 52 where it is secured at 54 to a motor-driven spindle 56, which is driven by a motor 70 in the direction of arrow 58 during the retrieval process.

Figure 4:
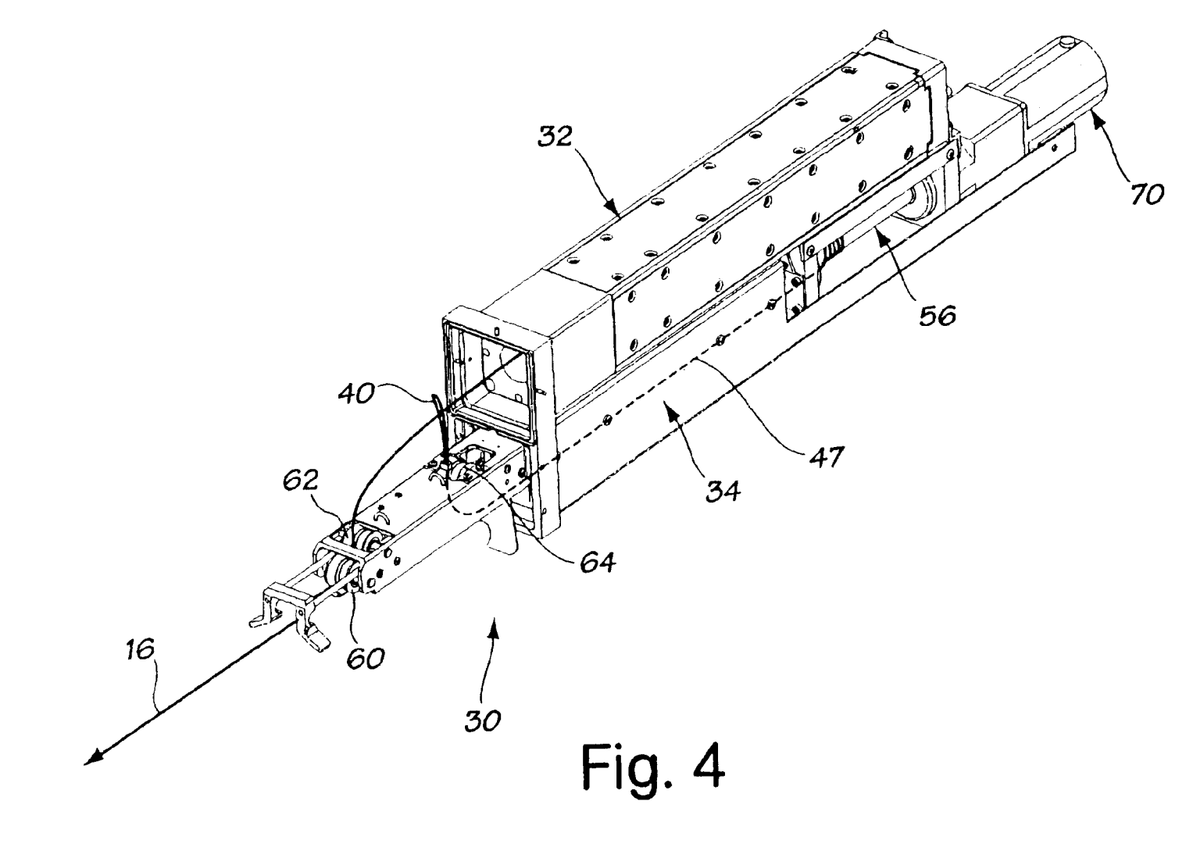
FIG. 4 is a diagrammatic illustration of the canister of FIG. 2 illustrating the telescoping deployment of the saddle or cradle, showing the feeding of the secured end of the loop through sheaves or rollers in the extended cradle back to a driven spindle.

Referring now to FIG. 4, with the telescoping cradle shown in the retrieval position as illustrated, the loop or lasso 40 is drawn by line 47 towards a pulley 60 up over a pulley 62 and then down through a pulley 64 from whence it is routed, as illustrated by the dotted portion of line 47 to spindle 56 which is driven by motor 70.

Figure 5A:
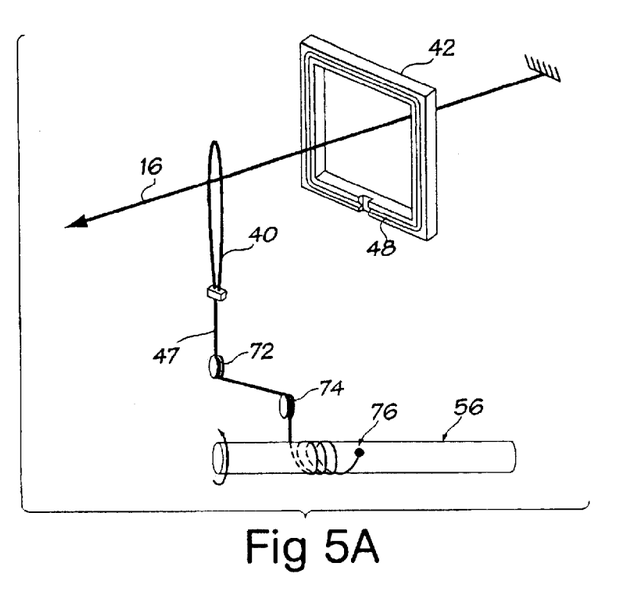
FIGS. 5A, 5B, and 5C are sequential diagrammatic illustrations of the snaring of the towed cable, formation of a loop in the towed cable created by the drawing of the lasso towards the driven spindle, and the wrapping of the looped towline around the driven spindle to a point at which the secured end of the towline may be severed; and, FIG. 6 is an isometric view of the capture of the towed decoy and the telescoping docking cradle once the decoy has been retrieved through the winding up of the towed cable on the driven spindle.

Referring to FIG. 5A, from a schematic point of view, loop 40 is shown to engage line 16 with the secured part of the loop having line 47 which goes over and around a number of pulleys 72 and 74, where it is wrapped as illustrated at 76 on rotating spindle 56.

Figure 5B:
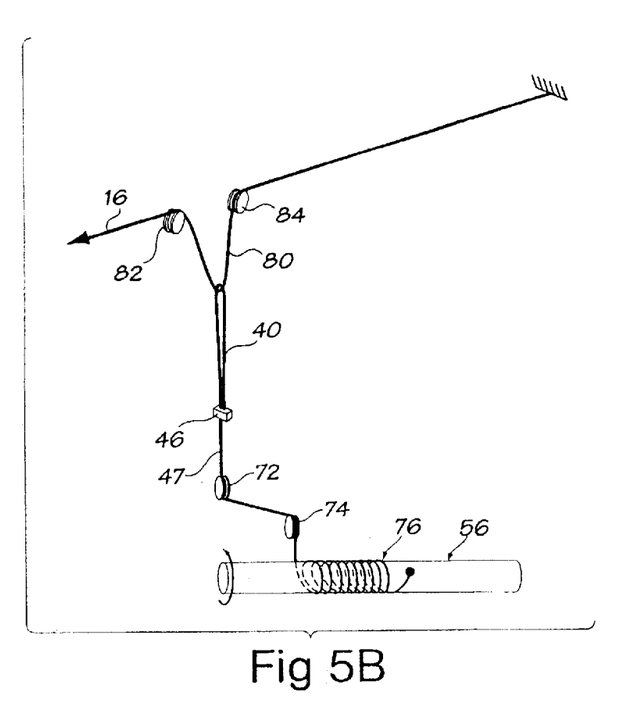
Figure 5C:
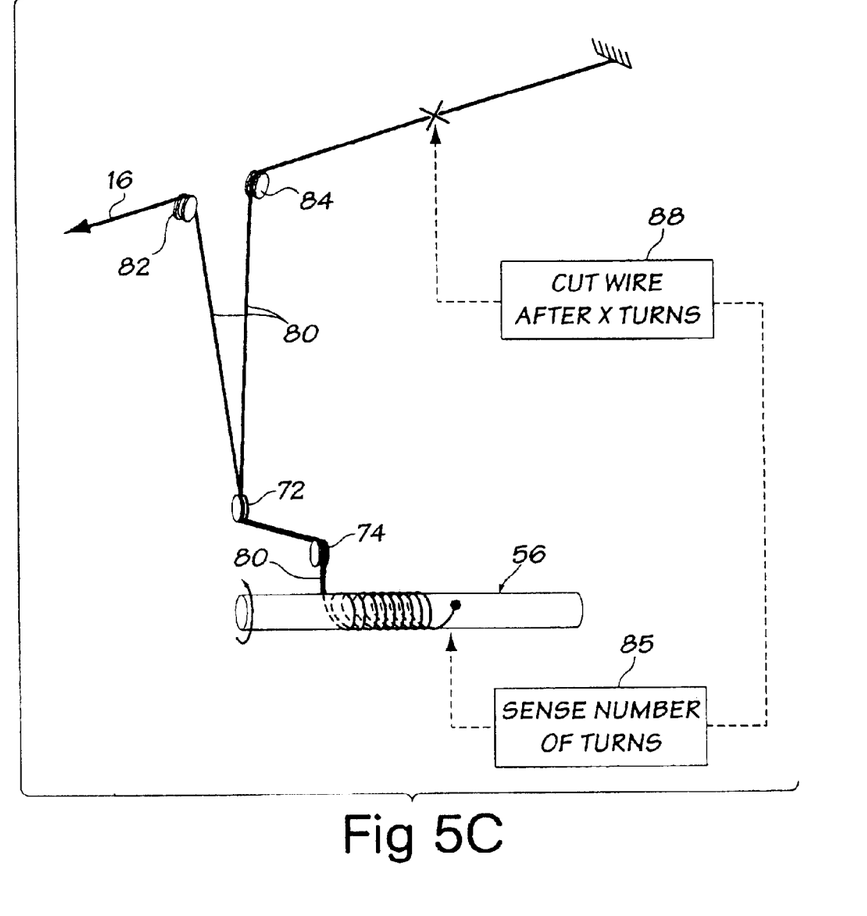

Referring to FIG. 5B, a loop 80 is formed by the dragging of the loop 40 in a downward direction, with line 16 going between pulleys 82 and 84. The dragging of this line, which will be appreciated as being in high tension, results in the dragging of loop 80 around spindle 56 as illustrated in FIG. 5C.

When a sufficient amount of looped line 80 is coiled about spindle 56 as detected at 85, then line 16 is severed as illustrated at 86 via a wire cutting actuator 88 in response to an output from detector 85, and the retrieval of line 16 continues due to the number of wraps on the spindle being sufficient to prevent loss of the decoy.

Figure 6:
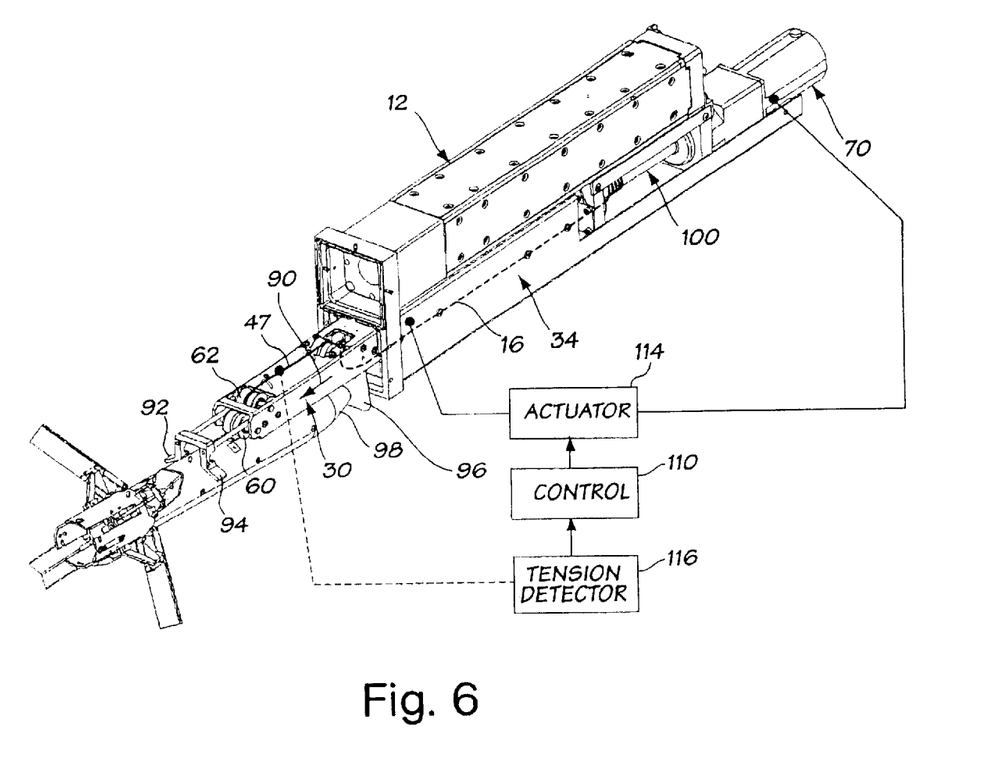

Referring now to FIG. 6, what is shown is the retrieval of decoy 14 into the telescoping docking saddle or cradle 30, which is shown in its deployed position, having moved as illustrated by arrow 90 aft of canister 12. This is accomplished through the use of an actuator 14 under the control of a control unit 110.

As can be seen, saddle or cradle 30 is provided with tangs 92 and 94, which coact with the top surface of the decoy and serve as a saddle for keeping the decoy in place in the saddle when line 16 is drawn taut, with line 16 going between rollers 60 and 62.

Also shown is a bumper or stopping mechanism 96 which prevents the decoy from moving forwardly, with the nose 98 of the decoy coacting with this bumper to prevent movement of the decoy when it is reeled into its stored position.

It will be appreciated that the translatable telescoping docking saddle is deployed only after the decoy is beyond a certain prescribed distance from the canister so as not to interfere with the paying out of the towing cable.

Key to the reeling in of the decoy so that a maximum amount of cable can be stored in a compact way on a spindle and to prevent untoward fouling of the cable around the spindle during the retrieval process, is a level-winding spindle system 100 in which cable being retrieved or wound around the spindle is optimally wrapped around the spindle due to the operation of a driven guided carriage mechanism that guides the cable onto the spindle due to helical driven grooves on a rotatable shaft that translates the carriage guidance mechanism back and forth over the driven spindle in timed relationship thereto.

The utilization of a level-winding spindle in the subject invention permits recovery of larger amounts of cable than heretofore possible because of the efficiency of the level winding system. Not only is the efficiency important but also the relative freedom from fouling and snapping in such a system permits more secure retrieval of the decoy itself.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for recovery of a body towed from a moving vehicle utilizing a towing cable, comprising:
    a lasso positioned about said cable and having a free end, said cable being under tension during towing;
    a winch having a driven spindle, said free end attached to said spindle and adapted to draw in said lasso and the cable lassoed thereby;
    a motor for driving said winch to reel in said body; and,
    a cutter for severing said cable when a predetermined number of turns of said cable have been winched in over said spindle, whereby said body can be recovered.

2. The system of claim 1, wherein said towed body is a decoy and further including a canister for housing said decoy, said winch, said motor and said cutter.

3. The system of claim 2, and further including an extensible boom carrying a cradle for capturing said decoy when said decoy is reeling in by said winch.

4. The system of claim 3, wherein the end of said cutter is fixedly attached to said canister.

5. The system of claim 4, wherein said boom includes cable guides and wherein said cable runs over said cable guides when said decoy is deployed.

6. The system of claim 5, wherein two of said cable guides are in spaced apart relationship with the free end of said lasso pulling the portion of the cable contacted thereby between said two spaced apart cable guides in a direction transverse to the direction of the tensioned cable with such force that the contacted portion of said cable forms a loop that is co-wound with the free end of said lasso on said spindle.

7. The system of claim 2, wherein said canister includes a frame located at the end through which said decoy and cable passes during deployment with said cable passing through said frame, said frame including means for detachably mounting said lasso therein during deployment of said decoy.

8. The system of claim 7, wherein said detachable mounting means includes an annular slot in said frame for housing said lasso.

9. The system of claim 8, and further including material in said slot for releasably retaining said lasso in said slot.

10. The system of claim 9, wherein said materials is wax.

11. A method for retrieving a decoy having a towing cable secured to a decoy canister, the cable being carried on a spindle in the canister and pulled out to permit rapid deployment of the decoy, the decoy being retrieved without driving the spindle, comprising the steps of:

lassoing a portion of the towing cable after deployment of the decoy;

reeling in the lasso and the lassoed portion of said cable onto a driven spindle; and, severing the cable adjacent to the secured end thereof after a predetermined number of wraps of said cable have been wrapped around the driven spindle.

12. The method of claim 11, wherein the predetermined number of wraps is such as to provide sufficient functional adherence of the cable so as to preclude unwinding of the cable and loss of the decoy.

* * * * *